M. VAN BAKEL.
CHANGE SPEED GEAR.
APPLICATION FILED FEB. 3, 1922.

1,414,063.

Patented Apr. 25, 1922.
2 SHEETS—SHEET 1.

Inventor:
Michel Van Bakel
per, J. Evers
Attorney.

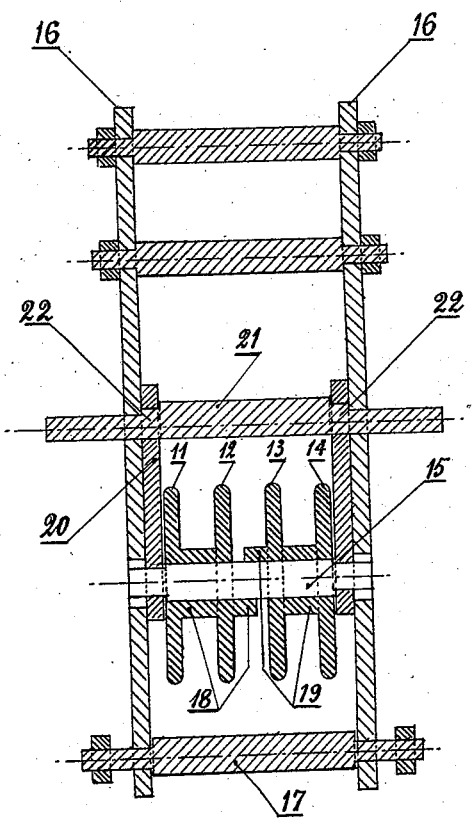

UNITED STATES PATENT OFFICE.

MICHEL VAN BAKEL, OF OVERPELT, NEAR NEERPELT, BELGIUM.

CHANGE-SPEED GEAR.

1,414,063.        Specification of Letters Patent.    Patented Apr. 25, 1922.

Application filed February 3, 1922. Serial No. 533,942.

*To all whom it may concern:*

Be it known that I, MICHEL VAN BAKEL, a subject of the King of the Belgians, residing at Overpelt, near Neerpelt, Belgium, have invented new and useful Improvements in or Relating to Change-Speed Gears, of which the following is a specification.

The present invention relates to improved change-speed-gear based on the transmission of movement by means of three sets of discs of which the intermediate one has its discs in contact with the discs of the other two sets e. g. driving and driven, the object of the invention being to provide a change-speed-gear wherein any bevel, spur or like gearing is totally absent. With this object in view, the change-speed-gear according to the invention comprises two parallel shafts maintained by a rigid frame, e. g. a driving shaft and a driven shaft, and carrying each a set of solid discs, in combination with a third shaft or intermediate shaft, parallel to the two other shafts and also carrying a set of solid discs, and the position of which can be adjusted but only within such limits that it is always kept at a distance from the plane passing through both the centre of the driving and the centre of the driven shafts and between the two planes passing through the said centres at right angles to the first named plane.

The discs on the driving and driven shafts are thinned down from the centre towards the edges so as to provide on one or both of their faces as may be convenient a radially inclined or conical circular surface, and the discs of the said two sets are arranged in pairs in such a way that each pair is composed of a driving disc and a driven disc situated in different but parallel planes spaced apart of a suitable perpendicular distance to allow the insertion between them of one of the discs of the intermediate set in such a manner that one edge of the periphery (of which the edges are rounded for the purpose) of the said intermediate disc is in contact with a point of the conical face of the driving disc of the corresponding pair while the other edge is in contact with a point of the conical face of the driven disc of the said pair. It will therefore be readily understood that if the position of the intermediate discs is altered by adjusting the position of their shaft, in such a manner that the relative radial distances from the points of contact of the intermediate discs with the conical faces of the corresponding driving and driven discs to the respective centres of the said driving and driven discs are modified, the speed at which the driven discs and consequently the driven shaft will be rotated through the medium of the intermediate discs will consequently vary.

In order that the invention may be readily understood an embodiment of same is, by way of example only, illustrated by the accompanying drawing, wherein:

Fig. 3 is a cross section on the line B—B of Fig. 1.

Figure 1:
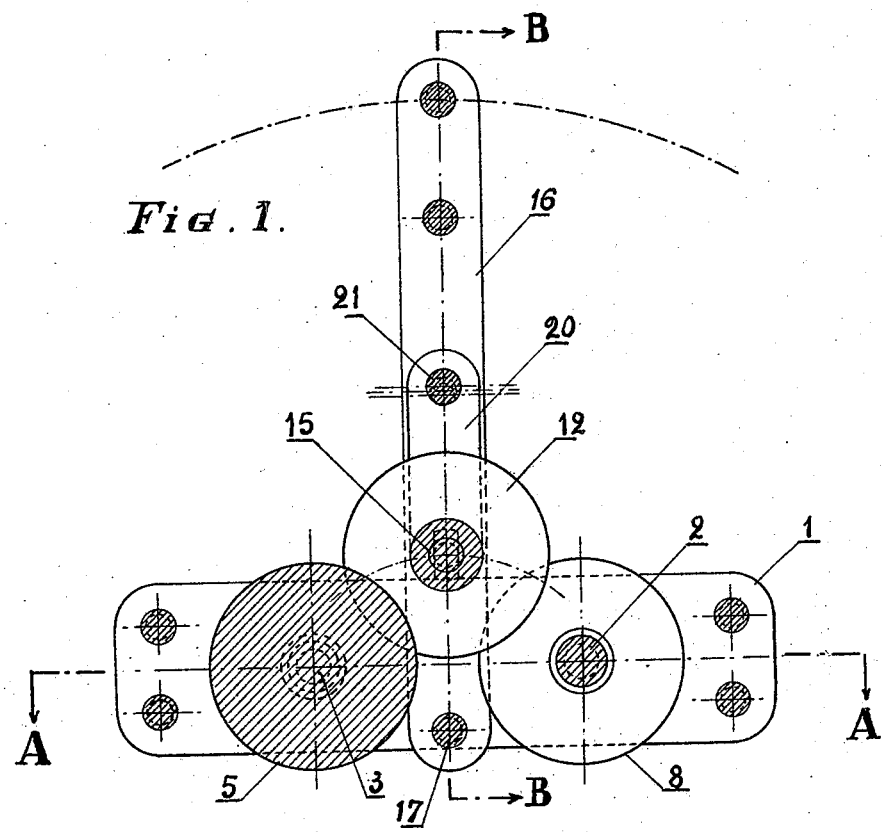
Fig. 1 is a central section through an improved change speed-gear according to the invention in a plane at right angles to the axis of the shafts.
Figure 2:
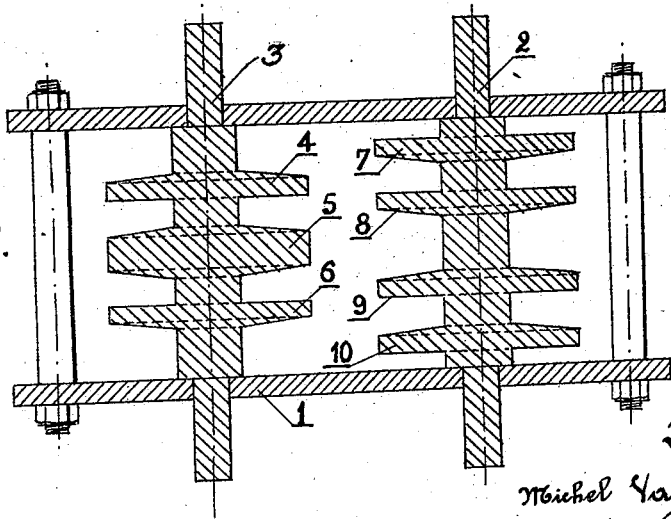
Fig. 2 is a sectional plan on the line A—A of Fig. 1.

1 is a rigid frame strongly assembled in any suitable manner, and which carries the whole of the apparatus; 2 and 3 are respectively the driving and the driven shafts, both rotatably carried in suitable bearings. Each of the shafts 2 and 3 is provided with a set of solid discs 4, 5, 6, and 7, 8, 9, 10 respectively, of metal or any other suitable material. The discs 4 and 7, 5 and 8, 5 and 9, and 6 and 10 form pairs of which the units are situated in different but parallel planes spaced apart of a suitable distance to allow the insertion between the two units of each pair of one of the discs of an intermediate set of solid discs 11, 12, 13 and 14 provided on a 3rd shaft 15 parallel to the shafts 2 and 3. This third shaft 15 is carried by a frame 16 which is normally in an approximately right angled position in relation to the frame 1 and is pivoted to the latter at a point 17 situated centrally between the central axes of the shafts 2 and 3 which are at right angles to the axis A—A passing through both the said centres.

The frame 16 is thus able to move about the pivot 17, and can therefore be inclined so as to bring the shaft 15 to one side or the other of the axis B—B. The driving and driven discs have those of their faces between which the intermediate discs are inserted provided with radially inclined or conical circular surfaces, while the intermediate discs 11, 12, 13 and 14 have both their peripheral edges rounded. The last-named discs are carried on sleeves or bushes able to move along the shaft 15, and in the example illustrated the discs 11 and 12 on the one hand and the discs 13 and 14 on the other hand, are secured in pairs on two bushes or sleeves 18 and 19 which are able to rotate freely on the shaft 15 and can be moved away from or towards each other in the direction of the longitudinal axis of the said shaft 15. In the example given, the disc 11 will be inserted between the discs 4 and 7, the disc 12 will be inserted between the discs 8 and 5, the disc 13 will be inserted between the discs 9 and 5, and the disc 14 will be inserted between the discs 10 and 6, and in each case one of the rounded edges of the periphery of the intermediate disc will touch the conical face of the corresponding driving disc while the other rounded edge will touch the conical face of the corresponding driven disc. For instance, one of the rounded edges of the periphery of the disc 11 will touch the conical face of the disc 7 while the other edge of the periphery of the said disc 11 will touch the conical face of the disc 4. This contact is limited a point owing to the fact that the edge of the periphery of the intermediate discs is rounded and that the contacting faces of the driving and driven discs are conical. It will be readily understood that to alter the speed of rotation of the driven shaft 3, it will be sufficient to provide means for changing the relative positions of the points of contact of the intermediate discs with the conical faces of the driving and driven discs in relation to the centres of rotation of the latter. To this effect the shaft 15 is suspended in suitable bearings provided at the lower ends of two arms 20 which are at their upper ends carried by the frame 16 through the medium of a bar 21 which is provided with suitable excentrated portions 22 to cause the arms 20, and therefore the shaft 15 carried thereby, to be raised or lowered by rotating the bar 21. Consequently the position of the centre of the shaft 15 may be altered both along the axis B—B and about the pivot 17, while the position of the discs 11, 12, 13 and 14 is simultaneously adjustable along the shaft 15, the plane of the said discs 11, 12, 13 and 14 remaining however during their movements always parallel to the planes of the driving and driven discs. These simultaneous movements compensate each other in such a way that the contact between each of the intermediate discs and the conical faces of the corresponding driving and driven discs is always maintained, while the relative positions of the two points at which these contacts occur may vary in relation to the centres of the driving and driven discs. The movement of the frame 16 about its pivot 17, and the rotation of the bar 21, may be obtained by any suitable or known hand operated means, and the change-speed-gear according to the invention also constitutes a clutch-mechanism which is very practical owing to its progressive or gradual operation and owing to the fact that such operation is completely independent from the movement of the motor.

The discs of the three sets may be of variable dimensions and their surfaces are hard but are in any convenient manner rendered suitable to obtain a good engagement at the points of contacts in order to avoid slipping or idle rotation. The number of power transmitting sets may be variable, and change speed-gear or clutch-mechanism constructed on principles in accordance with the invention may be used for the highest powers. If required for high powers, the number of discs and their sizes may be increased and the shaft 15 of the intermediate set of discs may be strengthened by means of any suitable support or bearing of known type.

The main advantages of change-speed-gear according to the invention are the following: (1) the variation of the speed is effected softly and without impact; (2) as the variation of the speed is effected gradually or progressively, a very wide range of speeds can be obtained instead of the restricted number (usually 3 or 4) of different predetermined speeds obtainable with the usual construction of change-speed-gear, in which it is impossible to obtain an intermediate speed between for instance the third and the fourth of the predetermined speeds obtainable.

It is to be understood that the invention is in no way restricted by the illustration or description of details of construction and arrangement given above, and that such details may be modified as required to meet various individual cases, while remaining within the limits of the principles of the invention as set forth in the appended claims.

I claim:

1. In change-speed-gear, the combination of: two parallel shafts supported in a rigid frame, one serving as a driving shaft and the other as a driven shaft; a set of solid driving discs on the driving shaft, having radially inclined or conical faces on one or both sides; a set of solid driven discs on the driven shaft, of which each is situated in a different but parallel plane in relation to one of the driving discs and has a radially inclined or conical face on the side facing the conical face of the said driving disc; an intermediate shaft extending parallel to the two first-named shafts and of which the position may be adjusted but is always kept at a distance from the plane passing through both the centre of the driving shaft and the centre of the driven shaft and between the two planes passing through the said centres at right-angles to the first-named plane; a set of intermediate discs, secured on sleeves rotatably mounted on the said intermediate shaft and capable of a limited movement along same, having both edges of their periphery rounded, and adapted to be partially inserted each between a driving disc and a driven disc in such a manner that one of the edges of its periphery is in contact with the conical face of the said driving disc while the other edge of the said periphery is in contact with the conical face of the said driven disc, whereby the speed of the movement of rotation imparted to be driven discs through the medium of the intermediate discs varies according to the variations of the position of the intermediate shaft owing to the consequent modification of the relative radial distances from the centres of the driving and driven discs to the points of contact of the respective conical faces of the said discs with the periphery of the intermediate discs, substantially as described.

2. In change-speed-gear as claimed in claim 1, a frame pivoted to a point of the frame supporting the driving and driven shafts situated on the axis crossing centrally and at right angles the axis passing through the centres of both the said shafts, and on the opposed side of the last-named axis in relation to the intermediate shaft; two arms supporting the ends of the said intermediate shaft; a rotatable bar carrying the said two arms and carried by the aforesaid pivoted frame, and provided with excentrated portions adapted to cause an adjustment of the position of the intermediate shaft in the longitudinal plane of the pivoted frame when the said rotatable bar is rotated; and suitable hand-operated means for rotating the said bar and for moving the aforesaid pivoted frame about its pivot, substantially as described.

In testimony whereof I signed hereunto my name in the presence of two subscribing witnesses.

M. VAN BAKEL.

Witnesses:
P. VAN EGLEN,
BEN GRAN O'REY.